Figures 1, 2:
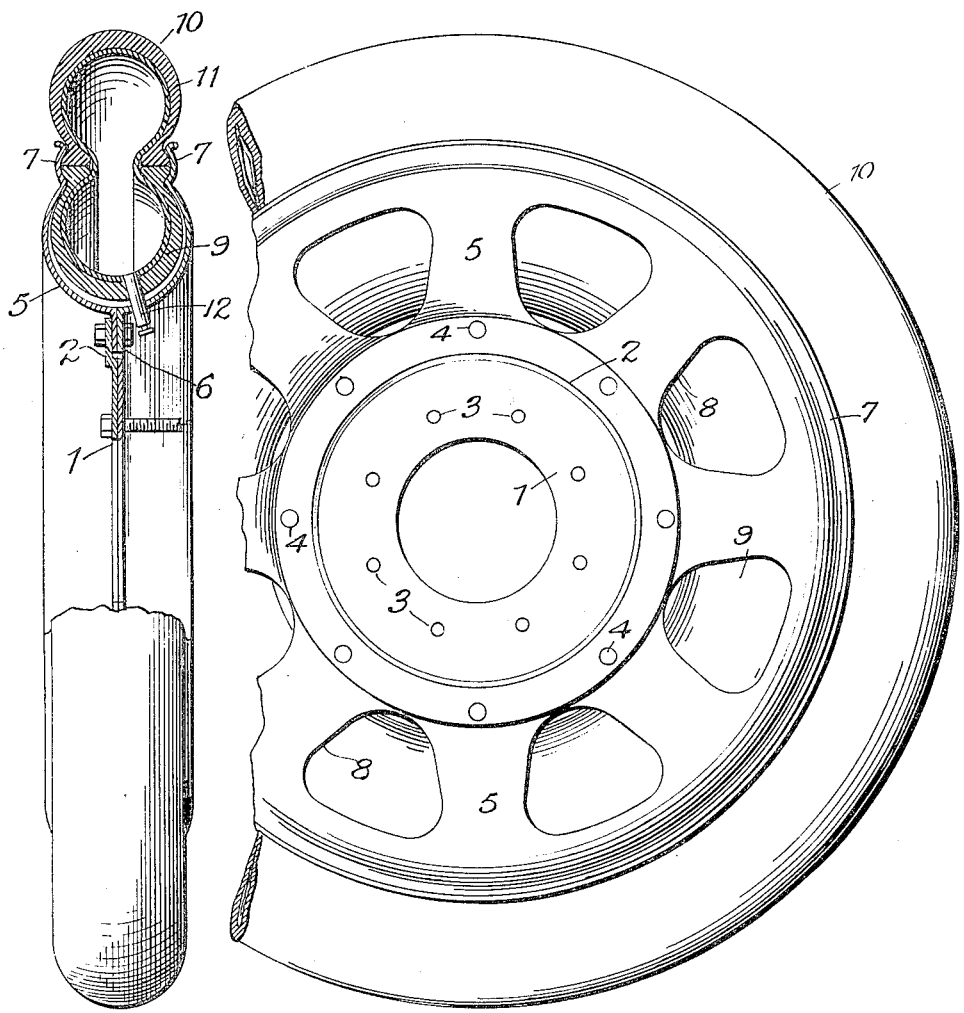

April 29, 1924.

R. W. MILLER

PNEUMATIC TIRE FOR VEHICLES

Filed Nov. 24, 1922

INVENTOR.
Robert W. Miller
BY Julian C. Dowell
his ATTORNEY.

Patented Apr. 29, 1924.

1,492,175

UNITED STATES PATENT OFFICE.

ROBERT W. MILLER, OF WILMINGTON, DELAWARE.

PNEUMATIC TIRE FOR VEHICLES.

Application filed November 24, 1922. Serial No. 603,086.

*To all whom it may concern:*

Be it known that I, ROBERT W. MILLER, a citizen of the United States, residing at Wilmington, in the county of New Castle and State of Delaware, have invented certain new and useful Improvements in Pneumatic Tires for Vehicles; and I do hereby declare the following to be a full, clear, and exact description of the invention, such as will enable others skilled in the art to which it appertains to make and use the same.

This invention relates to pneumatic tires for vehicles, and among other objects is intended to provide a highly resilient cushion tire having increased wear and endurance properties suitable for use on automobiles, motorcycles, bicycles and other tire equipped vehicles.

The single pneumatic tires commonly employed, particularly on motor vehicles, are necessarily subjected to heavy pounding blows and varying pressure impulses as the vehicle is driven over uneven ground or traffic-worn thoroughfares, and in order to minimize road wear thereon, it has become a universal practice to inflate the tires to maximum pressure at great sacrifice to tire resiliency, and consequently to the riding qualities of the vehicle. It is accordingly desired to provide a pneumatic tire which will reasonably endure the consequences of ordinary wear and render efficient service with the added advantages of increased durability and resiliency over tires now commonly used.

The practicability and simplicity of construction, comparative economy in manufacture and equipment, with increased comfort and reduced vibration, are further desiderata which have been borne in mind in producing the present invention.

The invention will first be hereinafter more particularly described with reference to the accompanying drawings which are to be taken as a part of this specification, and then pointed out in the claims at the end of the description.

In said drawings, Fig. 1 is a side elevation of a vehicle wheel equipped with my improved pneumatic tire; and Fig. 2 is a vertical elevation partly in section, taken diametrically through Fig. 1.

Referring to the drawings in which like reference numerals are used to denote corresponding parts throughout the several views, 1 denotes a demountable vehicle wheel, which in the form illustrated comprises a metallic disc having an outwardly extended circumferential flange 2 and a central annular opening through which the spindle of an axle may project. Bolt holes 3 are provided in the wheel 1 through which ordinary screw bolts may be extended for attachment to a wheel hub (not shown). A spaced series of bolt receiving holes 4 are also provided in the flange 2 of the wheel.

In the specific construction illustrated in the drawings, a demountable annular rim 5 which is substantially U-shaped in cross section, is bolted to the flange 2 of the wheel by means of an annular depending or inner circumferential rib or flange 6 formed by the united sections comprising the rim, bolt holes registering with the holes 4 in the flange 2 of the wheel being also provided in the flange 6, so that ordinary bolts may be inserted therethrough to secure the two parts together. Thus an annular channeled or hollowed rim is provided within which an inverted tire or casing may be inserted.

The parallel peripheral extremities of the opposing sections comprising the rim, are formed with oppositely related outward and upward bends to provide clincher portions or sides 7 between which the extremities of tires or casings may be clinched and retained. Lightening holes 8 may also be formed in the rim 5, said holes also serving to expose portions of an inverted protective tire or casing to the cooling effect of the atmosphere.

An inverted protective casing 9 preferably composed of rubber, reinforced with fabric or other material as in the ordinary pneumatic tire construction, is adapted to fit within the annular rim 5. Said casing is substantially "horse-shoe" shaped in cross section, its opposing sides being provided with the usual outwardly extending peripheral lips or flanges, adapted to engage and fit snugly between the co-operative clincher portions or sides 7 of the rim, so that the casing may be securely suspended within the hollowed rim.

By reference to Fig. 2, it will be observed that the outer diameter of the inverted protective casing 9 is noticeably less than the inside diameter of the rim 5, so that the rounded surface of the casing does not normally rest upon the rim. An intervening space is thus provided between the rim and the body of the casing, within which the casing 9 is free to expand or depress and rebound under temperature or pressure influences. This space also permits the free circulation of cooling air around the body of the casing, and allows the unrestricted spreading of the latter as the wheel passes over the uneven roadway so that the casing 9 will cushion the force of the impact and relieve the jolt upon the axle of the vehicle.

An ordinary pneumatic tire or casing 10 is also mounted on the rim 5, its clincher sides being securely held between the co-operating clincher portions 7 of the rim, and its flattened clincher extremities or beads resting in unobstructed continuous contact upon the opposing flattened clincher extremities or beads of the inverted protective casing 9 coextensively with their opposed peripheries or circumference, rather than upon the steel or wooden rim heretofore employed. A cross section taken through the respective casings when mounted one upon the other somewhat resembles an uncompleted figure 8.

An ordinary expansible or resilient inner tube 11 is placed within the doubled annular compartment or space created by the joinder of casings 9 and 10, said tube being provided with the usual depending valve 12 extending through an orifice in the casing 9 and through a corresponding recess provided in the rim 5, through which the tube may be inflated with air to the desired pressure.

My improved pneumatic tire is assembled as follows: The rim 5 is removed from the wheel 1 and pulled apart so that the inner protective casing 9 may be placed in position with its respective clincher flanges or beads fitted between the co-operating clincher portions 7 of the rim which is again bolted together. The inner tube 11 is then inserted within the casing 9 and the outer casing 10 is mounted on the rim in the usual way with the peripherally flattened clincher portions resting upon the opposed similarly flattened clincher portions of the inverted casing. Air is then supplied to the tube 11 through the valve 12 to inflate the tube to the desired pressure and the pressure in the tube will force the sides of the respective casings against the clincher portions 7 of the rim with their opposed flattened clincher portions in unobstructed pressure contact to more securely hold them in place. My improved pneumatic tire being thus readily mounted on the rim, the latter is secured to the wheel 1 by means of the bolts and nuts hereinbefore mentioned and as illustrated in the drawings.

From the foregoing description it will be readily understood that I have provided an improved double pneumatic cushioning means for vehicles of distinctly new and novel design in which any standard outer casing and inner tube of proper size to accommodate the dimensions of the outer casing may be employed. My improved device when mounted upon the rim and bolted to the wheel of the vehicle, will produce a finished appearance resembling the ordinary disc wheel commonly used on motor vehicles. The resiliency and cushioning effect of the tire is obviously doubled by reason of the enlarged air chamber or space which the tube 11 occupies between the two casing members 9 and 10, and the relative advantages of resiliency over the ordinary pneumatic tire will greatly add to the ease of riding and comfort of the occupants of an automobile equipped with my improved device, lessening the force of road impact or blow to the vehicle, decreasing road wear on the outer shoe and relieving the vibration usually incident to a vehicle when traveling over a highway. Upon severe road impacts or excessive pounding caused by driving the vehicle over a badly worn highway or across deep depressions therein, the exterior casing will tend to flatten at the point of impact and exert an increased pressure at that point upon the inner casing, causing the latter to resiliently respond and rebound against the U-shaped wall of the hollow rim, its suspending clincher flanges being momentarily pressed inwardly at that point under the excessive pressure exerted thereupon by the outer tire, after which it will again contract to normal position within the rim, thus greatly reducing wear and the detrimental effect of road shock upon the tire and vehicle, affording increased resiliency to the tire and adding to the ease and comfort of riding.

It will be understood of course that outer casings having straight sides may be used instead of the usual clincher type, and since various alterations and changes may be made without departing from the spirit and scope of this invention I do not desire to be restricted by the appended claims to the specific structure as hereinbefore illustrated and described.

Having thus described my invention, what I claim as new and desire to secure by Letters Patent of the United States is:

1. In combination with a vehicle wheel, a rim, an inverted tube protective casing carried suspended within said rim, a pneumatic tire mounted upon said rim and unobstructedly resting with its flattened clincher portions upon the flattened clincher portions of said inverted casing coextensively with their opposed peripheries and an inflatable tube inserted between said casing and said tire.

2. In combination with a vehicle wheel, a hollow rim, an inverted tube protective casing carried within said rim with its outer periphery spaced apart therefrom, a pneumatic tire mounted upon said rim with its clincher portions unobstructedly resting upon the clincher portions of said inverted casing throughout their entire circumference and an inflatable tube inserted between said casing and said tire.

3. In combination with a vehicle wheel, a hollow metallic rim having clincher portions in its sides, an inverted protective cushioning casing suspendingly fitted within said rim and an outer pneumatic tire mounted upon the rim and unobstructedly resting with its clincher portions upon the clincher portions of said protective casing co-extensively with their opposed peripheries, the sides of the respective casings being securely clinched between the clincher portions of said rim, and an inner expansible tube inserted between said casings.

4. In combination with a vehicle wheel, a hollow demountable metallic tube receiving rim having peripheral clincher flanges formed in its respective sides, an inverted tube protective casing suspendingly carried within said rim with its outer periphery spaced apart therefrom and having clincher portions formed in its extremities, a pneumatic tire mounted upon said rim also having clincher portions formed in its extremities and unobstructedly resting with said extremities in pressure contact upon the extremities of said inverted casing coextensively with their opposed peripheries said casing and said tire being retained between the clincher flanges in said rim by means of their respective corresponding clincher portions, and an inner inflatable tube expansively confined partly within said casing and partly within said tire, whereby pressure will be equally distributed upon the walls of each when the tube is inflated with air and cushion the force of road impact as the vehicle is driven over uneven road.

In testimony whereof I affix my signature in the presence of two witnesses.

ROBERT W. MILLER.

Witnesses:
HARRY B. STRADLEY,
MARY E. HAVEY.